United States Patent
Nakamura et al.

(10) Patent No.: US 6,342,933 B1
(45) Date of Patent: Jan. 29, 2002

(54) LIQUID CRYSTAL DISPLAY INCLUDING DRIVING CIRCUIT SUBSTRATE HELD BETWEEN CONVEX PORTION AND ELASTIC PRESSING PORTION FORMED ON TWO BOX MEMBERS

(75) Inventors: Masao Nakamura; Akihiro Mori, both of Kumamoto (JP)

(73) Assignee: Kabushiki Kaisha Advanced Display, Kumamoto (JP)

( * ) Notice: Subject to any disclaimer, the term of this patent is extended or adjusted under 35 U.S.C. 154(b) by 0 days.

(21) Appl. No.: 09/597,557

(22) Filed: Jun. 20, 2000

(30) Foreign Application Priority Data

Jun. 29, 1999 (JP) .......................... 11-184110

(51) Int. Cl.[7] .......................................... G02F 1/1333
(52) U.S. Cl. ................................................ 349/58
(58) Field of Search ........................ 349/58, 149–152

(56) References Cited

U.S. PATENT DOCUMENTS 6,128,063 A * 10/2000 Uchiyama et al. .......... 349/150

FOREIGN PATENT DOCUMENTS

| JP | 61-2127 A | * | 1/1986 |
| JP | 6-347814 | | 12/1994 |

* cited by examiner

*Primary Examiner*—William L. Sikes
*Assistant Examiner*—Tarifur R. Chowdhury
(74) *Attorney, Agent, or Firm*—McDermott, Will & Emery

(57) ABSTRACT

A liquid crystal display capable of following behavior of a liquid crystal panel and securely grounding a driving circuit substrate to a metal box member is obtained. In the liquid crystal display possessing the metal box member 11, a mold box member 17 with a back light source, and the driving circuit substrate 12 for driving the liquid crystal panel held by these two cage bodies, wherein the driving circuit substrate 12 is held between a convex portion 11a formed in one of the two cage bodies and an elastic pressing portion 17a formed in the other box member, the driving circuit substrate 12 is grounded to the metal box member 11 through this holding portion, and the driving circuit substrate 12 is held without being secured.

2 Claims, 3 Drawing Sheets

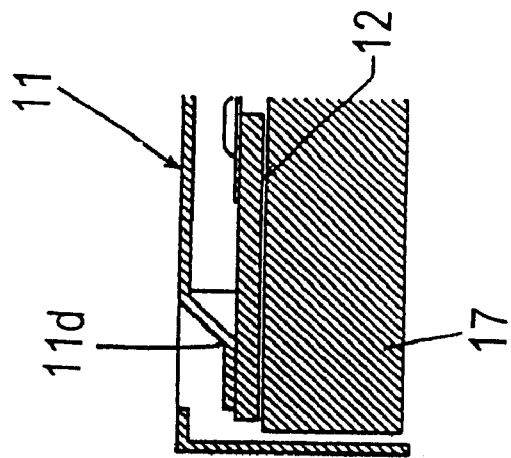
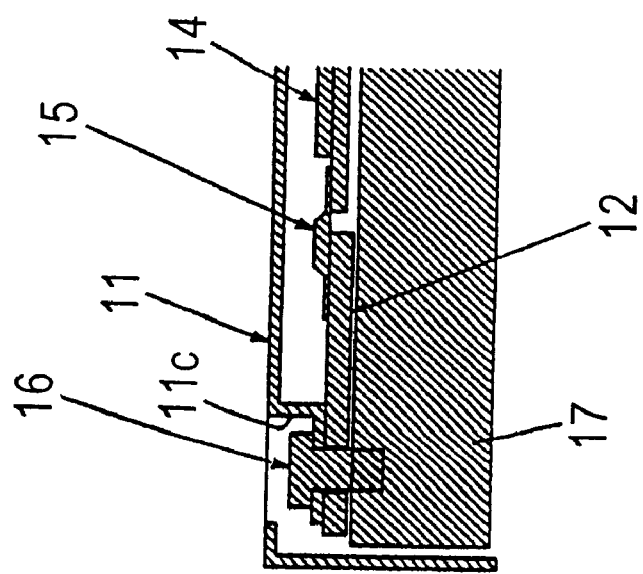
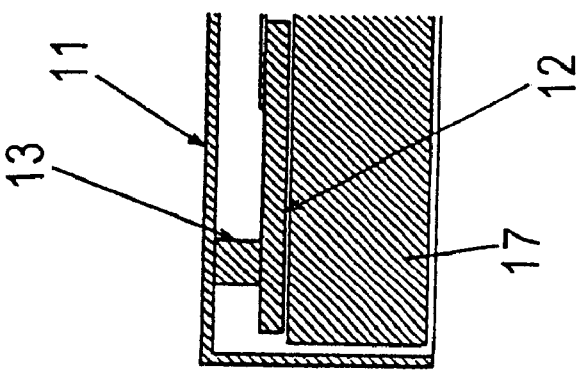

LIQUID CRYSTAL DISPLAY INCLUDING DRIVING CIRCUIT SUBSTRATE HELD BETWEEN CONVEX PORTION AND ELASTIC PRESSING PORTION FORMED ON TWO BOX MEMBERS

BACKGROUND AND SUMMARY OF THE INVENTION

1. Industrial Field

The present invention relates to a liquid crystal display and, more particularly, to a holding structure of its driving circuit substrate.

2. Prior Art

In conventional liquid crystal displays, a holding structure of a driving circuit substrate shown in FIGS. 3(a), (b) and (c) is known. In FIG. 3(a), a driving circuit substrate 12 placed between a metal box member 11 and a mold box member 17 mounted with a back light source is held by a conductive elastic spacer 13 inserted between the metal box member 11 and the driving substrate 12, and the driving circuit substrate 12 is grounded to the metal box member 11 through this spacer 13.

In FIG. 3(b), the driving circuit substrate 12 is held between a cut-and-hung-down portion 11c formed in the metal box member 11 and the mold box member 17, the driving circuit substrate 12 is secured with a screw 16, and the driving circuit substrate 12 is grounded to the metal box member 11.

In FIG. 3(c), the metal box member 11 is provided with a cut-and-hung-down portion 11d, the driving circuit substrate 12 is held between the cut-and-hung-down portion 11d and the mold box member 17, and the driving circuit substrate 12 is grounded to the metal box member 11 through the cut-and-hung-down portion 11d.

The holding and grounding structure in FIG. 3(a) has a problem wherein the conductive elastic spacer 13 is essentially required. Therefore, not only required number of parts is increased but also the modulus of elasticity of the conductive elastic spacer 13 varies due to application of heat. As a result, holding and grounding of the driving circuit substrate 12 and the metal box member 11 become uncertain.

The holding and grounding structure in FIG. 3(b) has a problem wherein the driving circuit substrate 12 is secured with the screw 16. Therefore, when some external force such as an impact is applied thereto, the driving circuit substrate 12 cannot follow behavior of a liquid crystal panel 14, stress concentration takes place at a TCP (a Tape Carrier Package) 15 where the liquid crystal panel 14 and the driving circuit substrate 12 are connected, and the TCP, which is a weak portion, is broken, eventually resulting in malfunction of the liquid crystal display.

The holding and grounding structure in FIG. 3(c) has a problem wherein it is difficult to control size of the cut-and-hung-down portion 11d of the metal box member 11, and holding and grounding of the driving circuit substrate 12 and the metal box member 11 become uncertain.

As described above, any of the conventional structures has problems such as uncertainty of grounding of the driving circuit substrate and the metal box member, increase in number of the parts, decrease in machinery strength, and so on.

SUMMARY OF THE INVENTION

The present invention was made to solve the above-discussed problems incidental to the prior art and has an object of providing a liquid crystal display in which unnecessary stress on the connecting portion between the driving circuit substrate and the liquid crystal panel is relaxed to the utmost and the driving circuit substrate is securely grounded to the metal box member.

A liquid crystal display according to the invention possesses at least a metal box member, a mold box member with a back light source, and a driving circuit substrate for driving a liquid crystal panel held by these two cage bodies, wherein the driving circuit substrate is held between a convex portion formed in one of the foregoing two cage bodies and an elastic pressing portion formed in the other box member, the driving circuit substrate is grounded to the metal box member through this holding portion, and the driving circuit substrate is held without being secured.

It is preferable that a portion where the elastic pressing portion contacts the driving circuit substrate is convex.

Other objects, features and advantages of the invention will become apparent in the course of the following description with reference to the accompanying drawings.

BRIEF DESCRIPTION OF THE DRAWINGS

FIGS. 3(a)–3(c) are sectional views of essential parts according to the conventional liquid crystal display.

DESCRIPTION OF THE PREFERRED EMBODIMENT

EXAMPLE 1

Figure 1:
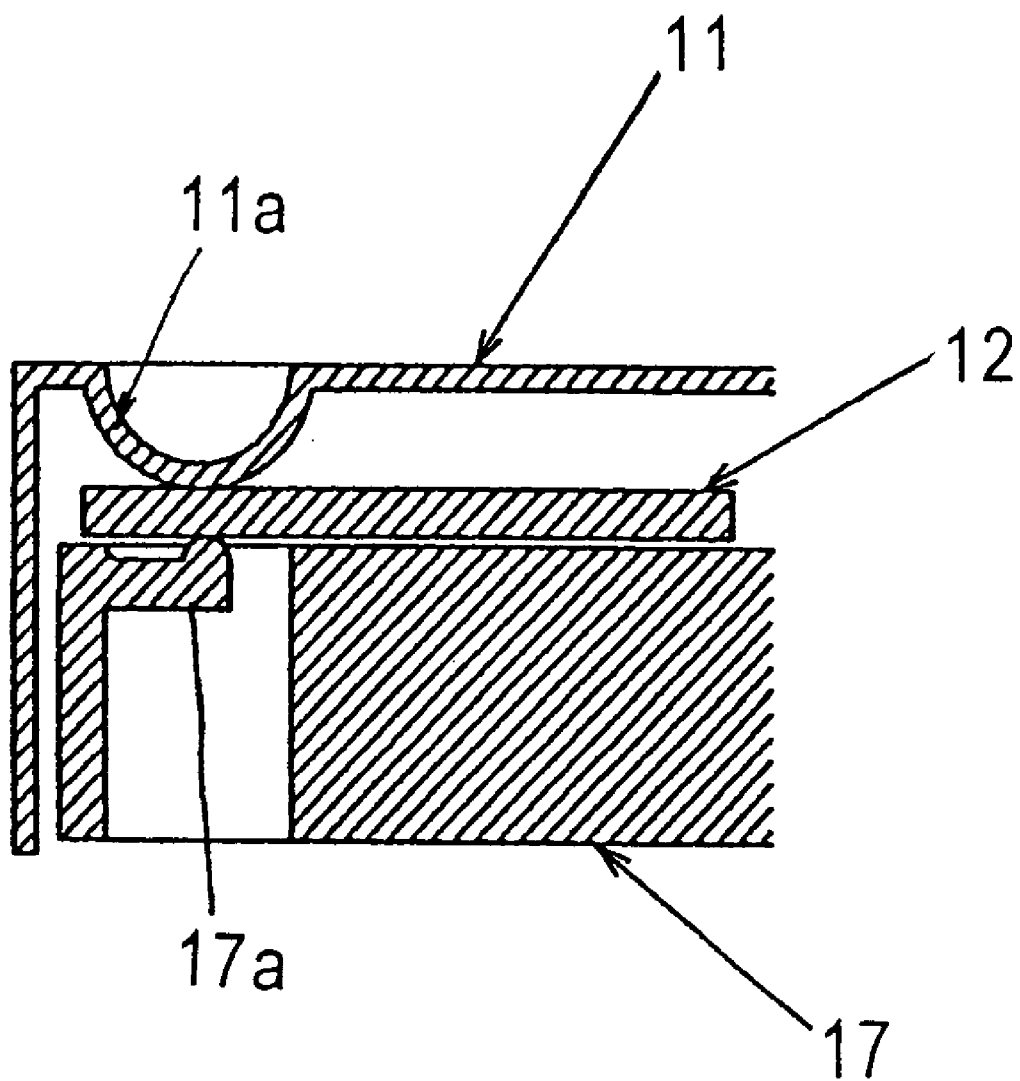
FIG. 1 is a sectional view of an essential part of a liquid crystal display according to Example 1 of the invention.

FIG. 1 is a sectional view of an essential part of a liquid crystal display according to Example 1 of this invention. In FIG. 1, reference numeral 11 is a metal box member provided with a convex portion 11a, numeral 12 is a driving circuit substrate connected to a liquid crystal panel, and numeral 17 is a mold substrate with a back light source. This mold substrate 17 is provided with a tongue-piece-shaped elastic pressing portion 17a facing the convex portion 11a of the metal box member and holding the driving circuit substrate 12 therebetween. An end of this elastic pressing portion 17a is convex, for example, hemispheric.

In this construction, the driving circuit substrate 12 is held between the metal box member 11 provided with the convex portion 11a and the mold box member 17 provided with the elastic pressing portion 17a having elasticity, and the driving circuit substrate 12 is securely grounded to the metal box member 11 and is held without being secured owing to the elasticity of the elastic pressing portion 17a of the mold box member 17, and it is therefore possible for the driving circuit substrate 12 to follow behavior of the liquid crystal panel.

EXAMPLE 2

Figure 2:
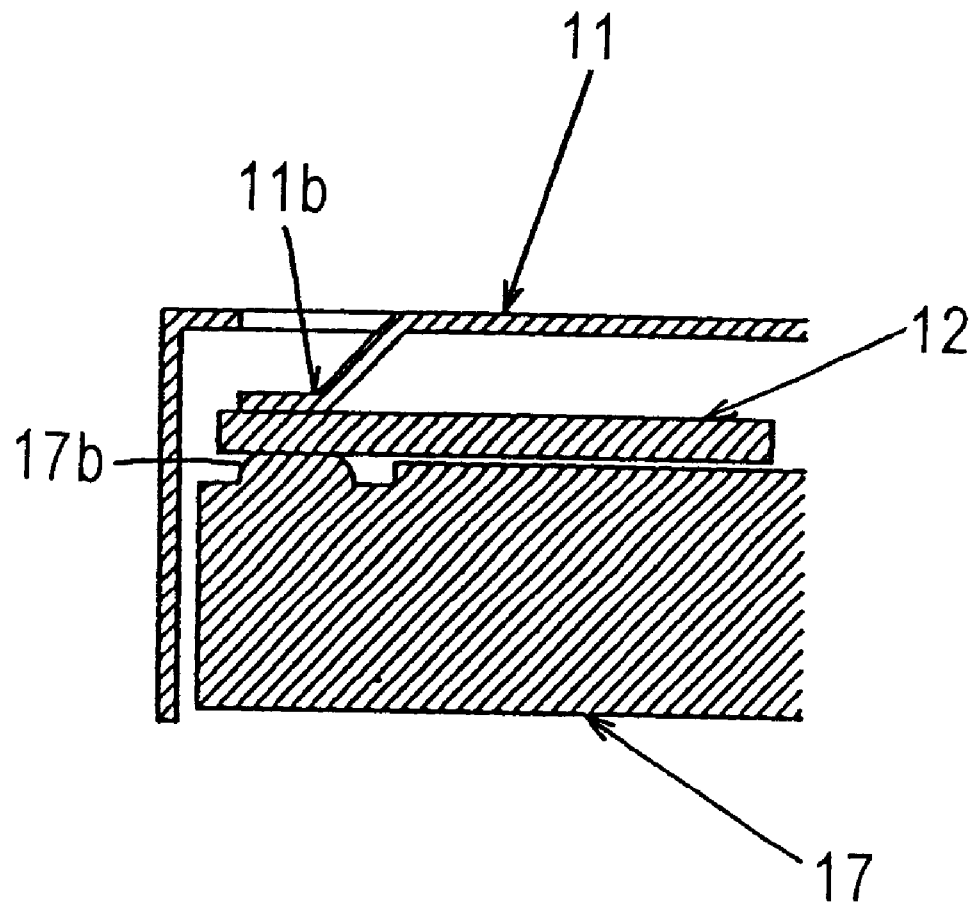
FIG. 2 is a sectional view of an essential part of a liquid crystal display according to Example 2 of the invention.

FIG. 2 shows Example 2 of a liquid crystal display according to this invention. In the drawing, numeral 11 is the metal box member 11 having an elastic pressing portion 11b which is cut and hung down to be tongue-piece-shaped and gives a spring force. Numeral 12 is the driving circuit substrate, and numeral 17 is the mold box member provided with a convex portion 17b placed facing the elastic pressing portion 11b.

In this liquid crystal display, the driving circuit substrate 12 is held between the metal box member 11 having the elastic pressing portion 11*b* and the mold box member 17 provided with the convex portion 17*b*, and the driving circuit substrate 12 is certainly grounded to the metal box member 11 and is held without being fixed owing to the force of the elastic pressing portion 11*b* of the metal box member 11.

As described above, the driving circuit substrate is held between the convex portion and the elastic pressing portion, and is grounded through the metal box member in this invention. As a result, the driving circuit substrate is securely grounded to the metal box member, and EMI (Electro-Magnetic Interference) of the liquid crystal display is decreased.

Furthermore, it is possible to hold the driving circuit substrate without securing it owing to the urging force of the elastic pressing portion, and therefore it is possible for the driving circuit substrate to follow behavior of the liquid crystal panel even in the case of applying external force such as an impact. As a result, it is possible to prevent stress concentration on the TCP where the liquid crystal panel and the driving circuit substrate are connected, and the performance is improved.

It is to be understood that the invention is not limited to the foregoing embodiment and various changes and modifications may be made without departing from the spirit and scope of the invention.

What is claimed is:

1. A liquid crystal display comprising at least a metal box member, a mold box member with a back light source, and a driving circuit substrate for driving a liquid crystal panel held by these two box members, wherein said driving circuit substrate is held between a convex portion formed in one of said two box members and an elastic pressing portion formed in the other box member, the driving circuit substrate is grounded to the metal box member through said convex portion, and the driving circuit substrate is held without being secured.

2. The liquid crystal display according to claim 1, wherein a portion where the elastic pressing portion contacts the driving circuit substrate is convex.

* * * * *